United States Patent [19]
Pong

[11] Patent Number: 5,138,496
[45] Date of Patent: Aug. 11, 1992

[54] ADJUSTING MECHANISM FOR A LENS

[75] Inventor: Kuo-Chen Pong, Chutung, Township, Taiwan

[73] Assignee: Microtek International Inc., Hsinchu, Taiwan

[21] Appl. No.: 664,385

[22] Filed: Mar. 4, 1991

[51] Int. Cl.$^5$ .............................................. G02B 7/04
[52] U.S. Cl. ..................................... 359/822; 359/819
[58] Field of Search ............... 359/819, 822, 823, 827, 359/829, 830

[56] References Cited

U.S. PATENT DOCUMENTS

| | | |
|---|---|---|
| 4,496,217 | 1/1985 | Aoyagi ................................. 359/823 |
| 4,946,255 | 8/1990 | Mizoguchi et al. ................... 359/827 |
| 5,050,963 | 9/1991 | Murakami ........................... 359/819 |

Primary Examiner—Bruce Y. Arnold
Assistant Examiner—James Phan
Attorney, Agent, or Firm—Ladas & Parry

[57] ABSTRACT

An adjusting mechanism for a lens comprises a mount, a sphere, a pressing ring, a positioning housing, a fixing ring, a lens, and an adjusting ring. Three protruding members are provided radially and horizontally around the circumference of the sphere. The sphere is stably disposed on the mount in an opening having a spherical surface provided on the center of the mount by three tension springs each secured between the protruding members and the mount. The inside of the sphere forms cylindrical space to accommodate the lens. The lens only axially moves with respect to the sphere by turning an adjusting ring screwed onto the sphere. The positioning housing is fixed on the mount around the sphere and the fixing ring is fastened on the top of the positioning housing. The pressing ring being disposed between the fixing ring and the sphere pushes against the surface of the sphere by the pressing of a circular flange provided along the inner rim of the fixing ring such that the sphere is restricted to rotate in the space formed between the pressing ring and the mount. The sphere rotates in three dimensions to adjust the lens precisely by turning three adjusting screws, wherein each adjusting screw comes into contact with the protruding member.

4 Claims, 3 Drawing Sheets

ADJUSTING MECHANISM FOR A LENS

BACKGROUND OF THE INVENTION

This invention generally relates to an adjusting mechanism for a lens, in particular, for use in scanners. It utilizes a sphere which is disposed in the opening of a mount having a spherical surface corresponding to the surface of the sphere, and a lens is engaged with the sphere. Hence, any rotation of the lens will correspond to that of the sphere. When the lens is adjusted to the desired result, the image of a document will pass through the lens by a scanner and is transmitted to a charge coupled device (CCD in abbreviation) to transform into electronic signals which can be treated by another electronic system.

Conventional lenses of the scanners are precisely adjusted before the scanners leave the factory. However, during the transportation or after a certain period of operation, the scanner may cause the lens to produce errors. It is necessary to readjust the lens to acquire clear images, but the method of conventional adjustment is very inconvenient.

SUMMARY OF THE INVENTION

It is therefore an object of this invention to provide an adjusting mechanism for a lens which mitigates the above drawbacks.

Another object of this invention is to provide an adjusting mechanism for a lens which utilizes a sphere and a lens being engaged therein for placement in the opening of a mount having a spherical surface corresponding to the surface of the sphere for automatically centering to adjust the lens precisely in three dimensions.

A further object of this invention is to provide an adjusting mechanism for a lens, wherein the sphere rotates on the spherical surface of the opening of the mount by turning adjusting screws so that the mechanism is easily operated and has high precision.

Yet another object of this invention is to provide an adjusting mechanism for a lens, wherein the lens longitudinally provides a groove on the outer wall thereof such that the lens moves axially during the fine adjustment of the lens to attain a constant optimum position of an image by turning an adjusting ring thereon instead of causing rotation.

These and other objects, advantages and features of the present invention will be more fully understood and appreciated by reference to the written specification and appended drawings.

DETAILED DESCRIPTION OF THE INVENTION

Figure 1:
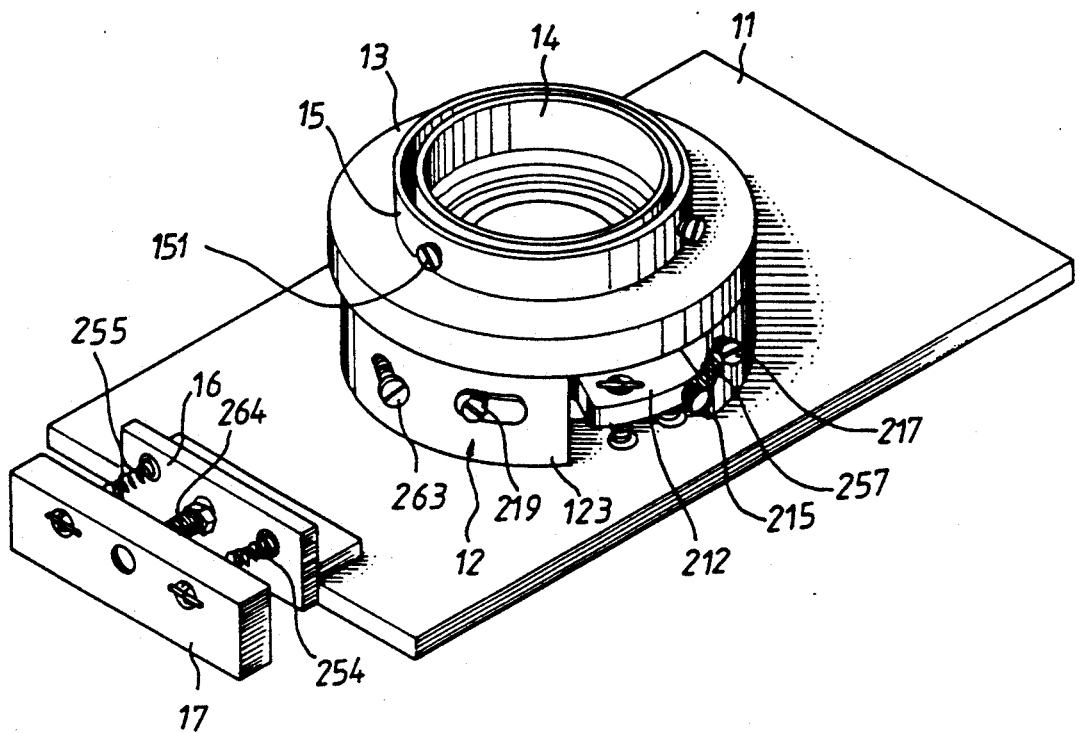
FIG. 1 is a perspective view illustrating an adjusting mechanism for a lens in accordance with the present invention in assembled condition.
Figure 2:
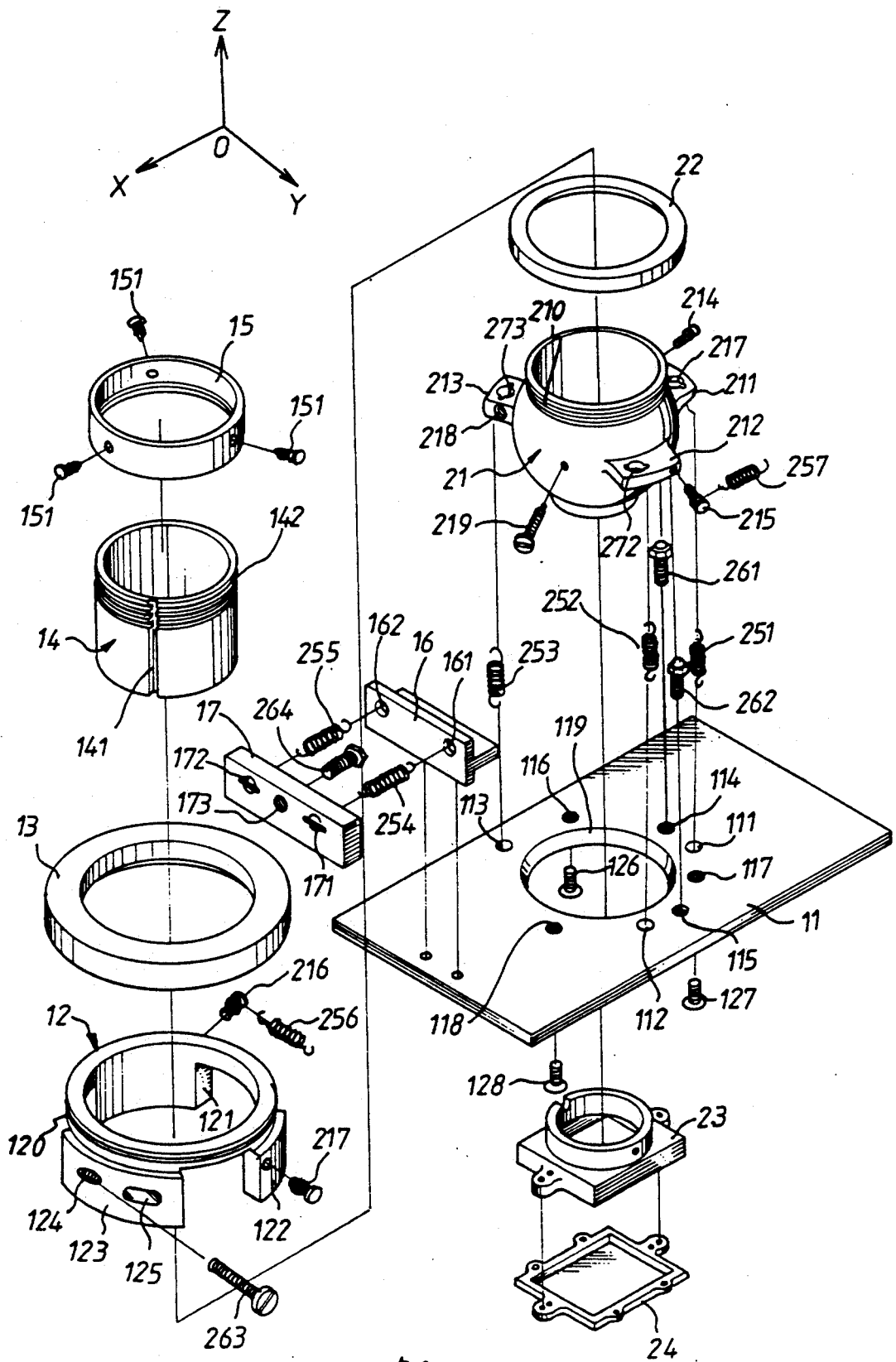
FIG. 2 is an exploded view illustrating component parts of the present invention.
Figure 3:
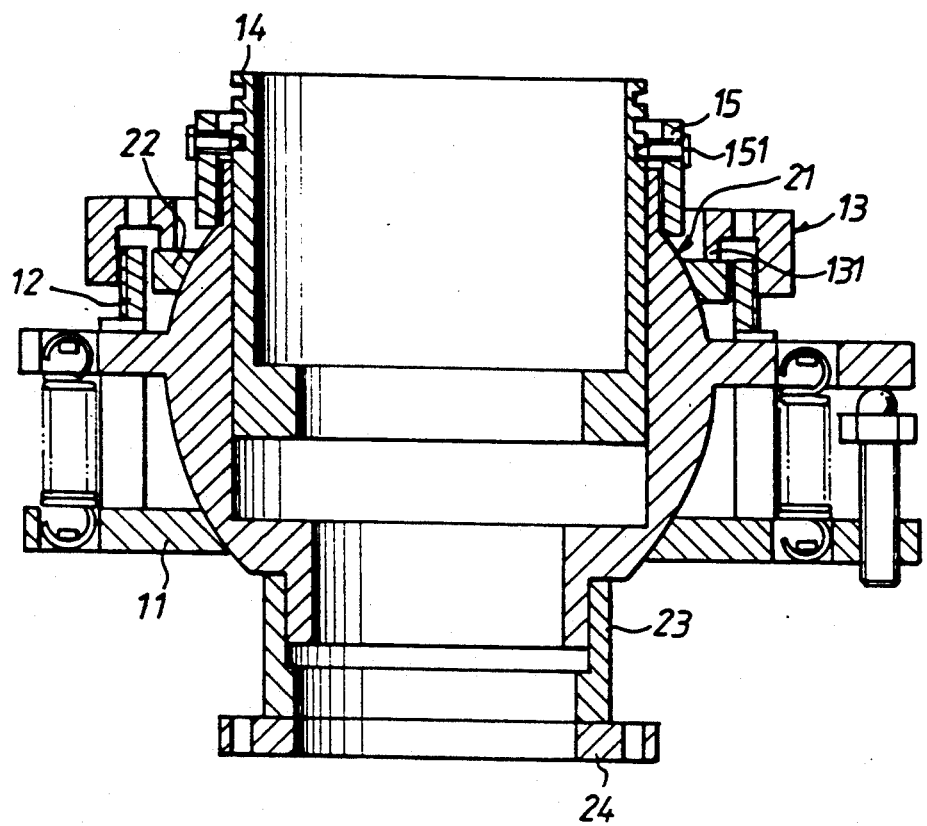
FIG. 3 is a cross-sectional view of an adjusting mechanism for a lens in accordance with the present invention.

Referring now to FIG. 1-3, an adjusting mechanism for a lens in accordance with the present invention mainly comprises a mount (11), a sphere (21), a pressing ring (22), a positioning housing (12), a fixing ring (13), a lens (14), and an adjusting ring (15). The sphere (21) is positioned in an opening (119) which has a spherical surface provided on the center of the mount (11). It should be noted that the diameter of the opening (119) is smaller than that of the sphere (21) such that the greater part of the sphere (21) is over the top surface of the mount (11). Three protruding members (211, 212 and 213) are provided radially and horizontally around the circumference of the sphere (21), wherein the angle between the first protruding member (211) and the second protruding member (212) is 90 degrees and the third protruding member (213) is located along the symmetrical axis between the first protruding member (211) and the second protruding member (212) in the reverse direction. A tension spring (251) is located between the first protruding member (211) and the mount (11), wherein one end of the tension spring (251) is secured to a hole (271) provided on the first protruding member (211) and the other end of the tension spring (251) is secured to a hole (111) provided on the mount (11). Likewise, a tension spring (252) is located between the second protruding member (212) and the mount (11), wherein one end of the tension spring (252) is secured to a hole (272) provided on the second protruding member (212) and the other end of the tension spring (252) is secured to a hole (112) provided on the mount (11); a tension spring is located between the third protruding member (213) and the mount (11), wherein one end of the tension spring (253) is secured to a hole (273) provided on the third protruding member (213) and the other end of the tension spring (253) is secured to a hole (113) provided on the mount (11). Hence the sphere (21) is firmly disposed on the mount (11) by the restraining force generated from the tension springs (251, 252 and 253). An adjusting screw (261) is located at a position near the tension spring (251), wherein its threaded end is screwed on the mount (11) in a threaded hole (114) provided thereof and another end of the adjusting screw (261) comes into contact with the bottom face of the first protruding member (211). Likewise, an adjusting screw (262) is located at a position near the tension spring (252), wherein its threaded end is screwed on the mount (11) in a threaded hole (115) provided thereon and another end of the adjusting screw (262) comes into contact with the bottom face of the second protruding member (212). In addition, an adjusting screw (263) obliquely passes through a positioning housing (12) (detailed description below) and its threaded end is obliquely screwed on the third protruding member (213) in an oblique threaded hole (218) laterally provided thereon. By means of turning the adjusting screws (261, 262 and 263) clockwise or counterclockwise will cause the sphere (21) to stably rotate in three dimensions.

The inside of the sphere (21) forms a cylindrical space to accommodate a lens (14). The lens (14) is provided with a groove (141) on the outer wall thereof. A positioning screw (219) is screwed onto the sphere (21) and the threaded end thereof is inserted into the groove (141) of the lens (14) such that the lens (14) axially moves with respect to the sphere (21).

The sphere (21) is encircled by a positioning housing (12). The positioning housing (12) is fixed onto the mount (11) by three screws (126, 127 and 128) passing through corresponding threaded holes (116, 117 and 118) provided around the opening (119) of the mount (11) then screwing on the positioning housing (12). The positioning housing (12) has three legs (121, 122 and 123) to utilize the gap between each leg for straddling the protruding members (211, 212 and 213) of the sphere (21). A screw (214) fastened on the first protruding member (211) which is adjacent to the leg (121) and a screw (216) fastened on the leg (121) are connected by a tension spring (256) hooked thereon. Likewise, a screw (215) fastened on the second protruding member (212) which is adjacent to the leg (122) and a screw (217) fastened on the leg (122) are connected by a tension spring (257) hooked thereon. The primary purpose of the arrangement of the tension springs (256 and 257) is to provide optimum stability in horizontal direction to make more precise adjustment of the lens during the rotation of the sphere (21). Besides, the leg (123) is transversely provided with an oblique threaded hole (124) and an opening (125). The adjusting screw (263) passes through the oblique threaded hole (124) and then screws on the oblique threaded hole (218) of the third protruding member (213). The positioning screw (219) passes through the opening (125) and then screws on the sphere (21) such that the threaded end of the positioning screw (219) comes into contact with the groove (141) of the lens (14) and inserts therein.

A fixing ring (13) having an inside thread is fastened on the threaded end (120) of the positioning housing (12). A pressing ring (22) having a spherical surface inside being positioned between the fixing ring (13) and the sphere (21) pushes against the surface of the sphere (21) by the pressing of a circular flange (131) provided along the inner rim of the fixing ring (13) such that the sphere (21) is restricted to rotate in the space formed between the pressing ring (22) and the mount (11).

An adjusting ring (15) having a inside thread is fastened on the threaded neck (210) of the sphere (21). The adjusting ring (15) has three screws (151) provided thereon and the distance between each one is equal. Each screw (151) is angled towards the center of the adjusting ring (15) and its front end is engaged with the circular groove (142) provided on one end of the lens (14). When turning the adjusting ring (15), each screw (151) will slide along the circular groove (142) of the lens (14) such that the lens moves axially without and rotation.

A converter (23) is fitted on the bottom of the sphere (21) and a charge coupled device (CCD in abbreviation) frame (24) is fixed on the bottom of the converter (23). A circuit board (not shown) is disposed in the CCD frame (24) to install the CCD such that the image of a document from a scanner (not shown) is transmitted to the CCD via the lens (14).

An adjusting member (16) is secured to one edge of the mount (11) and is transversely provided with holes (161, 162). A fixing member (17) opposite to the adjusting member (16) is transversely provided with holes (171, 172) at a location corresponding to the holes (161, 162) and is secured to a chassis (not shown). Two tension springs (254, 255) are located between the adjusting member (16) and the fixing member (17), wherein one end of the tension spring (254) is secured to the hole (161) and the other end of the tension spring (254) is secured to the hole (171); one end of the tension spring (255) is secured to the hole (162) and the other end of the tension spring (255) is secured to the hole (172). An adjusting screw (264) is located in between the tension springs (254, 255), wherein its threaded end is screwed on the fixing member (17) in a threaded hole (173) provided thereon and another end of the adjusting screw (264) comes into contact with the surface of the adjusting member (16). It should be noted that the mount (11) is slidably mounted on a base (not shown) such that the mount (11) can move horizontally by turning the adjusting screw (264) in combination with the restraining force generated from the tension springs (254, 255).

In the operation of the adjusting mechanism for the lens according to the present invention, the adjustment of the lens is achieved by turning the adjusting screws to adjust the lens precisely in three dimensions. With reference to the space rectangular coordinate system shown in FIG. 2, the X-axis lies on the center line of the first protruding member (211), thus the Y-axis lies on the center line of the second protruding member (212) because the second protruding member (212) is perpendicular to the first protruding member (211). The sphere (21) rotates about the X-axis by turning the adjusting screw (262); the sphere (21) rotates about the Y-axis by turning the adjusting screw (261); the sphere (21) rotates about the Z-axis by turning the adjusting screw (263). In addition, as above-mentioned, the mount (11) moves horizontally by turning the adjusting screw (264). When the lens is adjusted to the desired result by the adjusting manner depicted above, the image of a document will pass through the lens by a scanner and is transmitted to the CCD. Moreover, the function of the groove (141) provided on the lens (14) is to assure the lens (14) that merely moves axially during the fine adjustment of the lens (14) by turning the adjusting ring (15) thereon instead of causing rotation. It will be apparent that the positioning screw (219) inserted in the groove (141) can be screwed tightly to fix the lens (14) after the adjustment of the lens (14) has been finished. It is very convenient to focus the lens when assembling or maintaining the mechanism because that the lens always attains a constant optimum position.

Of course it is understood that the above is merely a preferred embodiment of the invention and that various changes and alterations can be made without departing from the spirit and broader aspects thereof as set forth in the appended claims.

I claim:

1. An adjusting mechanism for a lens comprising:
   (a) a mount providing an opening having a spherical surface on the center thereof;
   (b) a sphere provided with a threaded neck thereon and having a cylindrical space inside being located in said opening of the mount, said sphere being provided with three protruding members radially and horizontally around the circumference thereof, each protruding member connecting with the mount by means of a tension spring secured therebetween, wherein the angle between the first protruding member and the second protruding member is 90 degrees, an adjusting screw being located at a position near the tension spring, said adjusting screw being screwed on the mount and another end thereof coming into contact with the protruding member, and the third protruding member having an adjusting screw obliquely screwed on one lateral side thereof;
   (c) a lens having a circular groove at one end thereof and being inserted into the cylindrical space of said sphere;
   (d) a positioning housing having one threaded end being fixed on the mount around the sphere, said positioning housing having three legs to straddle the protruding members by the interval between each leg, wherein one leg is provided with an oblique threaded hole such that the adjusting screw passes through said oblique threaded hole and then screws onto the third protruding member;

(e) a fixing ring with an inside thread being fastened on the threaded end of the positioning housing, said fixing ring being provided with a circular flange along the inner rim of the fixing ring;

(f) a pressing ring having a spherical surface inside being disposed between the fixing ring and the sphere, said pressing ring being pressed by the circular flange of the fixing ring; and (g) an adjusting ring having an inside thread being fastened on the threaded neck of the sphere, said adjusting ring having three screws provided thereon in equal space, each screw being engaged with the circular groove of the lens;

whereby said sphere rotates in three dimensions when each adjusting screw is turned.

2. An adjusting mechanism for a lens according to claim 1, wherein said first protruding member and said second protruding member are provided with a screw fastened thereon, said legs adjacent to the first protruding member and the second protruding member are provided with another screw fastened thereon, and said screws are connected by a tension spring hooked thereon.

3. An adjusting mechanism for a lens according to claim 2, wherein said lens is provided with a groove on the outer wall thereof parallel to the optical axis, and one leg of the positioning housing is provided with an opening and a positioning screw passes through the opening to insert into the groove.

4. An adjusting mechanism for a lens according to claim 3, wherein said mount is slidably mounted on a base and is provided with an adjusting member secured to one edge thereof, said adjusting member connects with a fixing member secured to a chassis by two tension springs secured therebetween, an adjusting screw is located between the tension springs and is screwed on the fixing member and another end thereof comes into contact with the adjusting member.

* * * * *